US006594734B1

(12) United States Patent
Kyker et al.

(10) Patent No.: US 6,594,734 B1
(45) Date of Patent: Jul. 15, 2003

(54) METHOD AND APPARATUS FOR SELF MODIFYING CODE DETECTION USING A TRANSLATION LOOKASIDE BUFFER

(75) Inventors: Alan Kyker, Portland, OR (US); Chan Lee, Portland, OR (US); Vihang D. Pandya, Beaverton, OR (US); Roshan Fernando, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/466,687

(22) Filed: Dec. 20, 1999

(51) Int. Cl.[7] .............................................. G06F 12/08
(52) U.S. Cl. ...................... 711/146; 711/207; 711/144; 711/125
(58) Field of Search ................................ 711/125, 207, 711/108, 144, 141, 146

(56) References Cited

U.S. PATENT DOCUMENTS

| | | | | |
|---|---|---|---|---|
| 5,133,058 A | * | 7/1992 | Jensen | 711/207 |
| 5,574,875 A | * | 11/1996 | Stansfield et al. | 711/3 |
| 5,835,949 A | * | 11/1998 | Quattromani et al. | 711/135 |
| 6,026,476 A | | 2/2000 | Rosen | 711/206 |

OTHER PUBLICATIONS

Eugene R. Hnatek; Random–Access Memories and Content-Addressable Memories, A User's Handbook of Semiconductor Memories; 1997; pp. 591–608; Wiley–Interscience Pub.
William Stallings; 7.3 Memory Management, Computer Organization and Architecture, Designing for Performance, 4th Edition; 1996; pp. 240–263; Prentice Hall, New Jersey.
Hamacher, Vranesic & Zaky; Computer Organization, 2nd Edition; 1984; pp. 306–329; McGraw–Hill Book Company.
Patterson & Hennessy; Computer Architecture: A Quantitative Approach; 1990; pp. 408–475; Morgan Kaufmann Publishers, San Mateo, CA.
Richard Kain; Advanced Computer Architecture: A Systems Design Approach; 1996; pp.75–88 and 456–474; Prentice Hall Englewood Cliffs, New Jersey.
Lean–Loup Baer; Computer Systems Architecture; 1980 pp. 139–166 and 314–325; Computer Science Press, Rockville, MD.

\* cited by examiner

Primary Examiner—Reginald G. Bragdon
(74) Attorney, Agent, or Firm—Blakely, Sokoloff, Taylor & Zafman LLP (57) ABSTRACT

Self modifying code is detected using a translation lookaside buffer in order to provide cache coherency. The translation lookaside buffer has physical page addresses stored therein over which snoops can be performed using the physical memory address of a store into memory. The translation lookaside buffer includes a content addressable memory which not only provides page translation but provides content addressability based on the physical page addresses stored therein. If a match occurs during a snoop using the translation lookaside buffer, it is possible that an SMC occurred within the page of locations stored in memory associated with the matched physical page addresses. To provide finer granularity than a page of addresses, FINE HIT bits are included with each entry in the cache associating information in the cache to portions of a page within memory. Snoop logic performs the comparison of the FINE HIT bits with the respective lower order bits of the physical address to determine if a self modifying code condition has occurred within the portion of memory that may be stored in the cache.

21 Claims, 8 Drawing Sheets

| PROGRAM ADDRESS (HEX) | CODE | INSTRUCTION # |
|---|---|---|
| 555 | ADD | $I1, I6$ |
| 557 | JMP 777 | $I2$ |
| ⋮ | ⋮ | ⋮ |
| 777 | ADD | $I3$ |
| 779 | SUB | $I4$ |
| 77A | JMP 555 | $I5$ |
| ⋮ | ⋮ | ⋮ |

METHOD AND APPARATUS FOR SELF MODIFYING CODE DETECTION USING A TRANSLATION LOOKASIDE BUFFER

BACKGROUND OF THE INVENTION

1. Field of the Invention

The present invention relates generally to software backward compatibility in advanced microprocessor hardware, and specifically to cache coherency and self modifying code detection using an instruction translation lookaside buffer.

2. Background Information

When a new computer is introduced it is oftentimes desirable to operate older application or operating system software in conjunction with new hardware designs. Previously dynamic memory was relatively expensive so older computer systems, upon which older application and operating system software would execute, had limited sizes available. Thus the older software applications and operating systems would use techniques to maximize the use of the available memory space in memory. Additionally, most computers share a common memory space for storing both Instructions and Data. This shared memory space allows Data Stores into memory to modify previously stored Instructions which are generally referred to as code. Under, strict timing requirements, this code modification can occur actively when a program is being executed. This occurrence of the program itself modifying an instruction within program memory is commonly referred to as self modifying code. In some cases, a Data Store that modifies the next instruction which is to be executed by the computer may require that the modification become effective before the next instruction can be executed. In other cases, the code modification may be the result of the computer system copying a new program into the physical memory that previously contained another program. In modern computer systems, multiple agents may be responsible for updating memory. In Multi Processor systems, each processor can perform stores to memory which could modify instructions to be executed by any or all processors in the system. Direct Memory Access (DMA) agents, such as disk controllers, can also perform stores to memory and thereby modify code. These code modifications are commonly referred to as cross modifying code. Hereinafter, all forms of code modification of previously stored instructions within memory of a computer system during program execution, regardless of whether it includes a single processor, a multi processor, or a DMA agent, are referred to as self modifying code (SMC). The definition of self modifying code as used herein includes the more common references to self modifying code and cross modifying code.

In order to speed up program execution, cache memory was introduced into computers and microprocessors. An instruction cache memory is a fast memory of relatively small size used to store a large number of instructions from program memory. Typically, an instruction cache has between 32 to 128 byte cache lines in which to store instructions. Program memory, more commonly referred to simply as memory, is usually a semiconductor memory such as dynamic random access memory or DRAM. In a computer without an instruction pipeline or instruction cache memory to store instructions mirroring a portion of the program memory, self modifying code posed no significant problem. With the introduction of instruction pipelines and cache memory into computers and their microprocessors, self modifying code poses a problem. To avoid executing an old instruction stored within an instruction pipeline or an instruction cache memory, it is necessary to detect a self modifying code condition which updates program memory. This problem can be referred to as cache coherency or pipeline coherency where the instruction cache or pipeline becomes incoherent (or stale) as compared with program memory after self modifying code occurs. This is in contrast to the problem of memory coherency where the cache is updated and memory is stale or incoherent.

In previous microprocessors manufactured by Intel Corporation, such as the Intel 80486 processor family, instructions from program memory were stored within an instruction pipeline to be executed "In-Order". In these "In-Order" processors, SMC detection was performed by comparing the physical address of all stores to program memory against the address of all instructions stored within the instruction pipeline. This comparison was relatively easy because the number of instructions in the instruction pipeline was typically limited to four or five instructions. If there was an address match, it indicated that a memory location was modified, an instruction was invalid in the instruction pipeline and that the present instruction pipeline should be flushed (that is disregarded or ignored) and new instructions fetched from program memory to overwrite the flushed instructions. This comparison of addresses is generally referred to as a snoop. With a deeper instruction pipeline, snoops require additional hardware because of the additional instructions having additional addresses requiring comparison.

Figure 1:
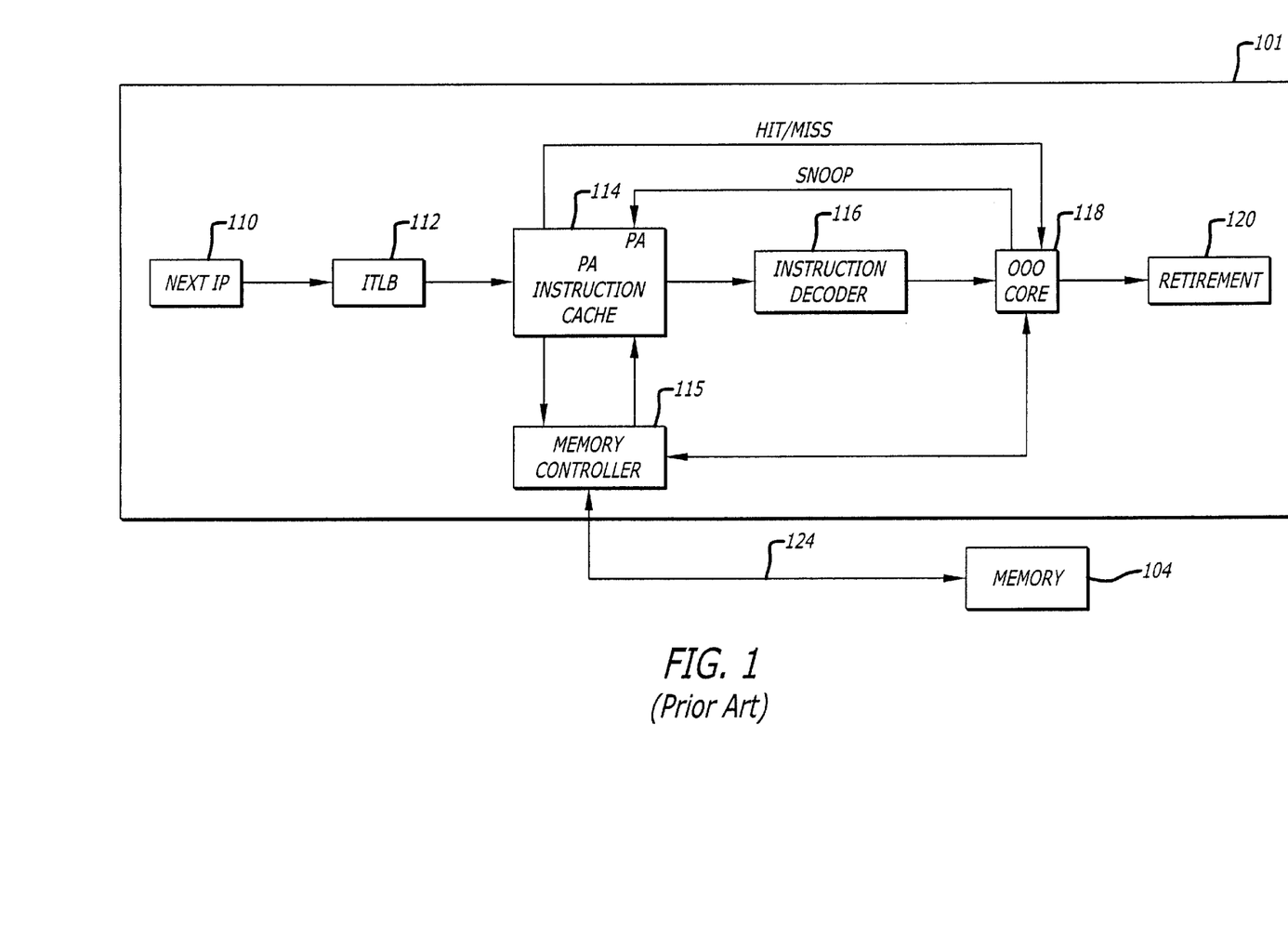
FIG. 1 illustrates a block diagram of a prior art microprocessor coupled to memory.

In another previous microprocessor manufactured by Intel Corporation, such as the Intel P6 of Pentium™ II processor family, instructions from program memory were stored within an instruction cache memory for execution by an "Out of Order" core execution unit. "Out of Order" instruction execution is preferable in order to provide more parallelism in instruction processing. Referring now to FIG. 1, a block diagram of a prior art microprocessor 101 coupled to memory 104 is illustrated. The Next Instruction process (IP) 110, also referred to as an instruction sequencer, is a state machine and branch prediction unit that builds the flow of execution of the microprocessor 101. To support page table virtual memory accesses, the microprocessor 101 includes an instruction translation lookaside buffer (ITLB) 112. The ITLB 112 includes page table entries of linear to physical address translations into memory 104. Usually the page table entries represent the most recently used pages of memory 104 which point to a page of memory in the instruction cache 114. Instructions are fetched over the memory bus 124 by the memory controller 115 from memory 104 for storage into the instruction cache 114. In the prior art, the instruction cache 114 is physically addressed. A physical address is the lowest level of address translation and points to an actual physical location associated with physical hardware. In contrast, a linear address is an address associated with a program or other information that does not directly point into a memory, cache memory or other physical hardware. A linear address is linear relative to the program or other information. Copies of instructions within memory 104 are stored within the instruction cache 114. Instructions are taken from the instruction cache 114, decoded by the instruction decoder 116 and input into an instruction pipeline within the out of order core execution unit 118. Upon completion by the out of order core execution unit 118, an instruction is retired by the retirement unit 120. The retirement unit 120 processes instructions in program order after they have completed execution. Retirement processing includes checking for excepting conditions (such as an occurrence of self modifying code) and committing changes to architectural state. That is, the out of order core execution unit 118 executes instructions which can be completely undone before being output by the microprocessor if some excepting condition has occurred which the retirement unit has recognized.

In "Out-Of-Order" processors, such as microprocessor 101, the number of instructions in the instruction pipeline are so great that it is impractical to compare all instructions in the pipeline of the microprocessor 101 with all modifications of program memory to be certain no changes have occurred. To do so would require too much hardware. In the prior art microprocessor 101, this problem was solved by having all store instructions executed by the out of order execution unit 118, which would execute a store instruction into the memory 104 or into a data cache within the execution unit 118, trigger a snoop of the instruction cache (the "Icache") 114. Additionally, instruction cache inclusion was provided to assure coherency of the instruction pipeline. Icache inclusion means that the instruction bytes for any instruction in the instruction pipeline are guaranteed to stay in the instruction cache 114 until the instruction is no longer stored within the instruction pipeline, i.e. retired. In this case, if cache coherency is maintained then pipeline coherency is maintained by the Icache inclusion.

Recall that the instruction cache 114 in the prior art microprocessor 101 is physically addressed. Therefore snoops, triggered by store instructions into memory 104, can perform SMC detection by comparing the physical address of all instructions stored within the instruction cache 114 with the address of all instructions stored within the associated page or pages of memory 104. If there is an address match, it indicates that a memory location was modified. In the case of an address match, indicating an SMC condition, the instruction cache 114 and instruction pipeline are flushed by the retirement unit 120 and new instructions are fetched from memory 104 for storage into the instruction cache 114. The new instructions within the instruction cache 114 are then decoded by the instruction decoder 116 and input into the instruction pipeline within the out-of-order core execution unit 118.

SUMMARY OF THE INVENTION

The present invention includes a method, apparatus and system as described in the claims.

Briefly in one embodiment, a microprocessor includes an execution unit and a translation lookaside buffer (TLB). The execution unit triggers a snoop operation in the TLB if a store into memory is executed. The TLB includes a content addressable memory (CAM). For the snoop operation, the TLB receives a physical address indicating the location where the execution of the store occurs in the memory. The TLB ordinarily stores page translations between a linear page address and a physical page address pointing to a page of memory having contents stored within a cache or a pipeline. To support snoop operations, the TLB includes a CAM input port to compare the physical address received by the TLB with the physical page addresses stored within the TLB.

Other embodiments are shown, described and claimed herein.

DETAILED DESCRIPTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Figure 2:
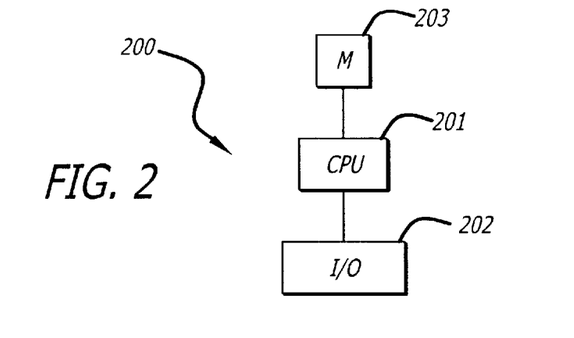
FIG. 2 illustrates a block diagram of a typical computer in which the present invention is utilized.

Referring now to FIG. 2, a block diagram of a typical computer 200 in which the present invention is utilized is illustrated. The computer 200 includes a central processing unit (CPU) 201, input/output devices (I/O) 202 such as keyboard, modem, printer, external storage devices and the like and monitoring devices (M) 203 such as a CRT or graphics display. The monitoring devices (M) 203 provide computer information in a human intelligible format such as visual or audio formats.

Figure 3A:
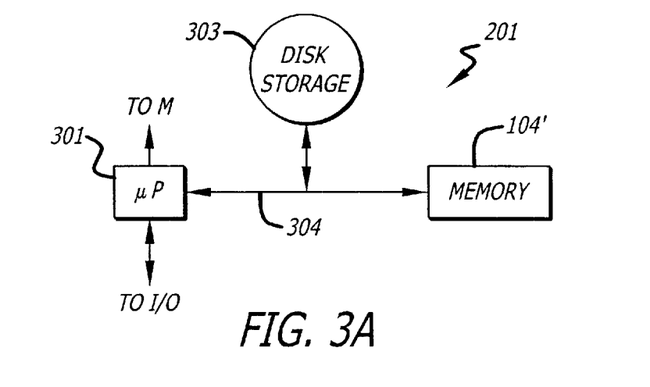
FIG. 3A illustrates a block diagram of a typical central processing unit in which the present invention is utilized.

Referring now to FIG. 3A, a block diagram of a typical central processing unit 201 in which the present invention is utilized is illustrated. The central processing unit 201 includes an advanced microprocessor 301 including the present invention, a disk storage device 303, and a memory 104' for storing program instructions coupled together. The prime notation used herein with reference designators indicates blocks having similar functionality with the same reference number; however, the block may be slightly altered to provide support for the advanced microprocessors of the present invention. For example, memory 104' may be considerably larger that memory 104 due to wider data bit width and address space provided by the advanced microprocessor 301. Disk storage device 303 may be a floppy disk, zip disk, DVD disk, hard disk, rewritable optical disk, flash memory or other non-volatile storage device. The microprocessor 301 and the disk storage device 303 can both read and write information into memory 104' over the memory bus 304. Thus, both the microprocessor 301 and the disk storage device 303 can alter memory locations within memory 104' during program execution. In order for the disk storage device 303 to do this directly, it includes a disk controller with direct memory access which can perform stores into memory and thereby modify code. Because the controller can directly access the memory it is an example of a Direct Memory Access (DMA) agent. Other devices having direct access to store information into memory are also DMA agents. Memory 104' is typically dynamic random access memory (DRAM) but may be other types of rewritable storage. Memory may also be referred to herein as program memory because it is utilized to store program instructions. Upon initial execution of a program stored in the disk storage device 303 or stored in some other source such as I/O devices 202, the microprocessor 301 reads program instructions stored in the disk storage device 303 or other source and writes them into memory 104'. One or more pages or fractions thereof of the program instructions stored within memory 104' are read (i.e. "fetched") by the microprocessor 301 for storage into an instruction cache (not shown in FIG. 3). Some of the program instructions stored in the instruction cache may be read into an instruction pipeline (not shown) for execution by the microprocessor 301.

Figure 3B:
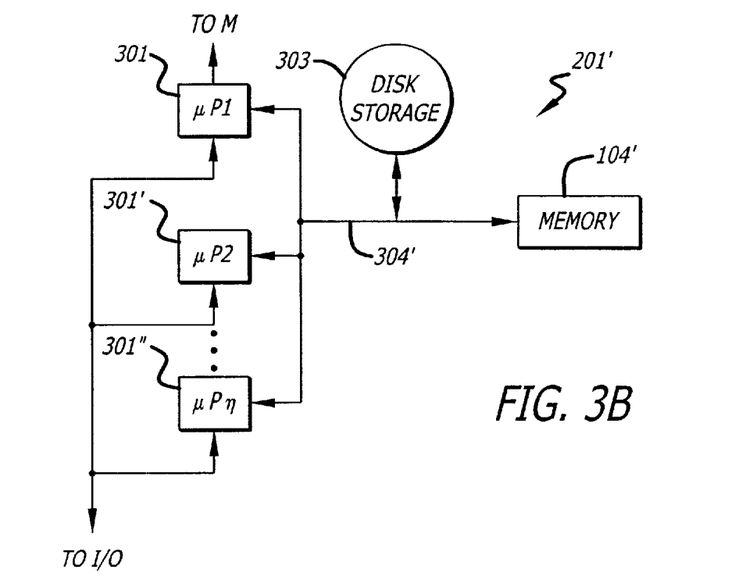
FIG. 3B illustrates a block diagram of a multiprocessor central processing unit in which the present invention is utilized.

Referring now to FIG. 3B, a block diagram of a multi-processor central processing unit 201' in which the present invention is utilized is illustrated. The central processing unit 201' includes multiple (N) advanced microprocessors 301 including the present invention labeled as microprocessors 301 through 301"; the disk storage device 303; and memory 104' coupled together as illustrated in FIG. 3B. The N microprocessors 301 through 301" and the disk storage device 303 can both read and write information into memory 104' over the memory bus 304'. That is memory 104' is shared by the N multiple processors 301 through 301". Any one of the N A microprocessors 301 through 301" or the disk storage device 303 can alter memory locations within memory 104' during program execution. In order for the disk storage device 303 to do this directly, it includes a disk controller with direct memory access which can perform stores into memory and thereby modify code. Because the controller can directly access the memory it is an example of a Direct Memory Access (DMA) agent. Other devices having direct access to store information into memory are also DMA agents. The present invention in each of the microprocessors 301 through 301" maintains cache coherency and pipeline coherency in a shared memory multiprocessor system.

Figure 4A:
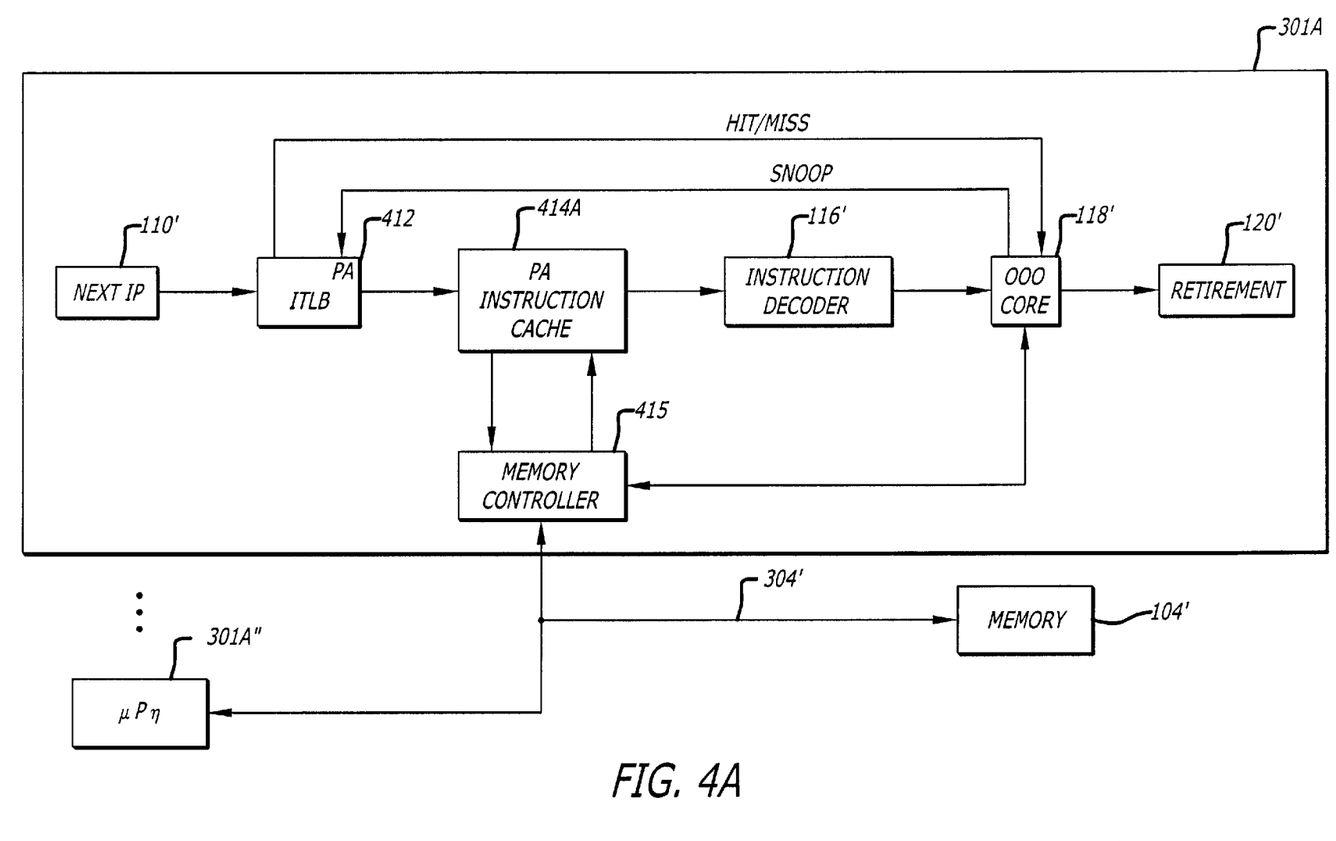
FIG. 4A illustrates a block diagram of microprocessors in a multiprocessor system coupled to a memory, the microprocessors including a first embodiment of the present invention.

Referring now to FIG. 4A, a block diagram of n microprocessors 301A through 301A" in a multiprocessor system, including a first embodiment of the present invention, are illustrated coupled to the memory 104'. Microprocessor 301A, as well as the other microprocessors of the multiprocessor system, includes a next instruction processor 110', an instruction translation lookaside buffer 412, an instruction cache 414A, a memory controller 415, an instruction decoder 116', an out of order core execution unit 118', and a retirement unit 120'. In the microprocessor 301, instructions can be stored in instruction storage elements (registers, buffers, etc.) from the ITLB 412 to the retirement unit 120'. These instruction storage elements within the instruction decoder 116', out of order core execution unit 118', the retirement unit 120', and other instruction storage elements are considered to be the instruction pipeline of the microprocessor. The instruction pipeline needs to be coherent (pipeline coherency) as does the instruction cache (cache coherency). Generally, the instruction decoder 116' accepts an instruction or operand at its input, decodes it, and performs the necessary instruction processing needed to form it into a micro-operand (UOP) which is understandable and can be executed by the out or order core execution unit 118'. In the preferred embodiment, the instructions or operands are INTEL X86 instructions which are backward compatible with software and decoded into UOPs which can be executed by the advanced execution unit 118'.

In a first embodiment, the instruction cache 414A is a physically addressable instruction cache containing physical addresses which could be used for snoops. However, in this case snoops for determining cache coherency and pipeline coherency are preferably performed using the instruction translation lookaside buffer (ITLB) 412 instead of the physically addressable instruction cache 414A in order to avoid complications of arbitration or dual porting of the instruction cache.

The instruction cache 414A may include instructions that can be used by the out of order core execution unit 118' to execute some function or process. If the function or process requires an instruction not within the instruction cache 414A, a miss has occurred and the instruction needs to be fetched from memory 104'. Memory controller 415 ordinarily interfaces to the instruction cache 414A in order to store instructions therein. In the case of a miss, memory controller 415 fetches the desired instruction from memory 104' and provides it to the instruction cache 414A.

Memory controller 415 additionally monitors the memory bus 304' to detect when a store has occurred into the memory 104' and reads the physical address of the store. In this manner when some external device such as a DMA agent (disk storage device 303) or a different microprocessor, such as 301A", alters a memory location within memory 104', the memory controller 415 triggers a snoop. In the preferred embodiment, the memory controller 415 communicates to the out of order core execution unit 118' that a store into memory has occurred in conjunction with the physical address in order to trigger the snoop. The out of order core execution unit 118' processes this information and causes the ITLB 412 to perform a snoop using the physical address read from the bus. In other embodiments the memory controller 415 may directly communicate to the ITLB 412 to execute a snoop with the physical address of the store. Each microprocessor 301 through 301" of the multiprocessor system 201' operate in this fashion to determine if a snoop need be triggered due to some externality. If the out of order core execution unit 118' itself performs a store into memory 104', it directly informs the ITLB 412 to perform a snoop and passes the physical address of the store.

The instruction translation lookaside buffer (ITLB) 412 contains page table address translations from linear to physical addresses into memory 104'. These page table address translations maintain an inclusion with all instructions in the instruction cache and the instruction pipeline. Inclusion meaning that any byte that went into making any instruction has its original translation within the ITLB 412. Generally, the ITLB 412 accepts an input linear address and returns a physical address associated with the location of instructions within memory 104'. Because the ITLB 412 has the physical page addresses and inclusion is provided, it can be used to perform snoops for SMC detection and maintain cache coherency and pipeline coherency. Because snoops for SMC detection are physical and the ITLB 412 ordinarily accepts as an input a linear address to translate into a physical address, the ITLB 412 is additionally formed as a content-addressable memory on the physical addresses and includes an additional input comparison port (referred to as a snoop port or reverse translation port) to perform content addressing of the physical addresses stored therein. When a snoop is triggered, the physical address of the store into memory is provided to the snoop port and the ITLB performs a comparison with all the physical page addresses located within the ITLB 412 to determine whether a store into memory has addressed a page which may be stored in the instruction cache 414A. If a match is found, a store occurred into memory within a page of instructions that may be stored within an instruction cache and the cache and the instruction pipeline may be incoherent with memory. Searching the content addressable memory within the ITLB 412 using the physical address as a key is a fast way to provide SMC detection and determine possible cache incoherency. This process, of providing a physical address to determine if a match exists with a physical address stored within the ITLB, is referred to as a reverse translation. The ITLB 412 having the CAM to provide this comparison of physical addresses may also be referred to as a reverse translation lookaside buffer. By moving SMC detection to the ITLB in the present invention, a snoop port need not be included into the instruction cache and thus the instruction cache can be considerably simpler with smaller physical, dimensions while providing the same number of bytes of storage locations.

The ITLB 412 furthermore provides inclusion for both the instruction pipeline as well as the instruction cache. Inclusion provided by the ITLB may be referred to as ITLB inclusion. Inclusion provided by the ITLB means that instruction bytes for any instruction in the instruction pipeline or the instruction cache are guaranteed to have their original page translation stay within the ITLB 412 until the associated instructions are no longer stored within the instruction pipeline, (i.e. retired) and are no longer stored in the instruction cache. For the ITLB 412 to provide inclusion, each page translation includes an INUSE bit upon which an INUSE state algorithm is used to set or clear the INUSE bit. The following INUSE state algorithm is used to provide ITLB inclusion. For each instruction fetch that requires a page translation, the ITLB entry used to perform the translation is marked INUSE using the INUSE bit. Since all instruction bytes in the instruction cache and instruction pipeline must have been originally fetched using the ITLB, and as long as no page translations are replaced that are marked INUSE, each instruction byte in the instruction cache and instruction pipeline will be guarded by the INUSE bit entries. Replacement means writing over a page translation with a new page translation.

As time goes by, more and more entries will get marked INUSE. Unless something is done to clear the INUSE bits, eventually all entries will be marked INUSE and no new entries can be allocated. When this happens, the microprocessor must be drained of all instructions (i.e. all executed to completion) and the instruction cache flushed (i.e. all cache lines invalidated). Once the processor is drained and the instruction cache flushed, all the INUSE bits in the ITLB can be reset indicating non-INUSE of the page translation. In addition, the INUSE bits can be reset any time the instruction pipeline is drained and the instruction cache is flushed for another reason (such as a process switch). In an alternate embodiment, selective invalidation of cache lines can be performed when a page translation with a set INUSE bit entry is replaced.

When an miss occurs in the ITLB, that is no page translation exist within the ITLB, any non-INUSE page translation entry can be selected for replacement since only entries with the INUSE bit set can have instructions in the pipeline.

Generally, the INUSE inclusion algorithm provides:
1. Each element has an INUSE state (the INUSE bit).
2. When an element is used, it is marked INUSE.
3. All INUSE bits can be cleared when it is known that all elements are not INUSE.
4. No element which is marked INUSE can be replaced. Any element that is not INUSE can be replaced.

Figure 4B:
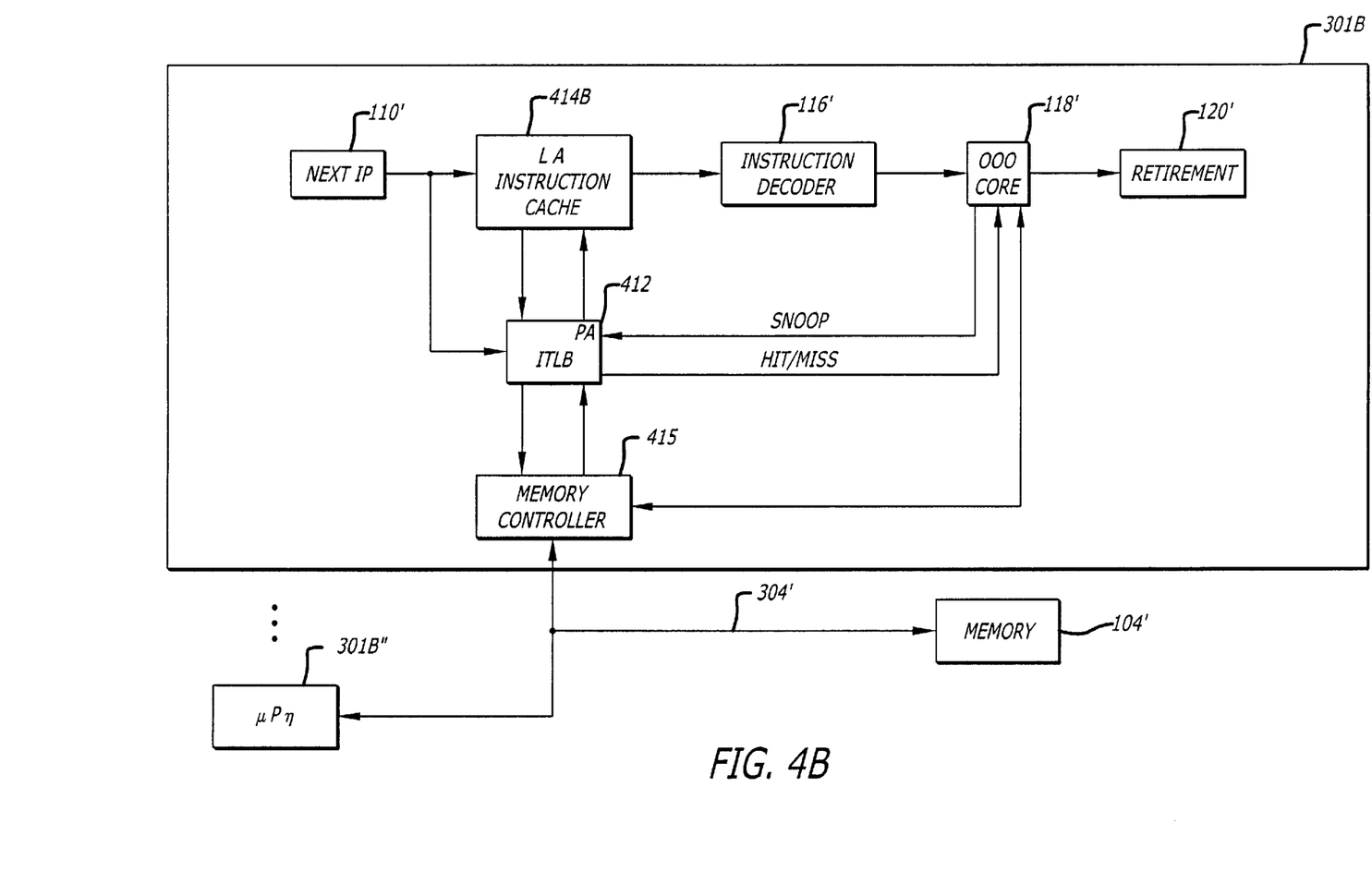
FIG. 4B illustrates a block diagram of microprocessors in a multiprocessor system coupled to a memory, the microprocessors including a second embodiment of the present invention.

Referring now to FIG. 4B, a second embodiment of the present invention is illustrated. In FIG. 4B, a block diagram of n microprocessors 301B through 301B" in a multiprocessor system, are illustrated coupled to the memory 104'. Elements of microprocessor 301B, are contained in the other microprocessors of the multiprocessor system. In FIG. 4B, the physically addressed instruction cache 414A is replaced with a linearly addressed instruction cache 414B. Other elements of the second embodiment being similar to the first embodiment are functionally equivalent. Because the instruction cache 414B contains no physical addresses, the snoops performed to maintain cache and pipeline coherency need to be performed by the instruction translation lookaside buffer (ITLB) 412 which contains physical addresses. In this second embodiment, the next IP 110' provides a linear address to both the linear address instruction cache 414B and the ITLB 412. Memory controller 415 detects external stores into memory. Upon detecting an external store into memory, the memory controller 415 communicates to the out of order core execution unit 118' that a store into memory has occurred in conjunction with the physical address in order to trigger the snoop. Upon the out of order core execution unit 118' receiving the signal from the memory controller 415 that a store into memory 104' occurred with the physical address, a snoop is triggered and the out of order core execution unit 118' provides the physical address to the ITLB 412. If the out of order core execution unit 118' itself performs a store into memory 104', it directly informs the ITLB 412 to perform a snoop and passes the physical address of the store.

If it is determined by the ITLB 412 that the physical address of the store into memory is associated with a page translation contained therein, an SMC hit is signaled to the out of order core execution unit 118' signaling that an instruction was possibly altered on a page stored within the instruction cache and/or the instruction pipeline. An advantage of the linear addressed instruction cache 414B is that latency of the instruction pipeline can be reduced.

Figure 4C:
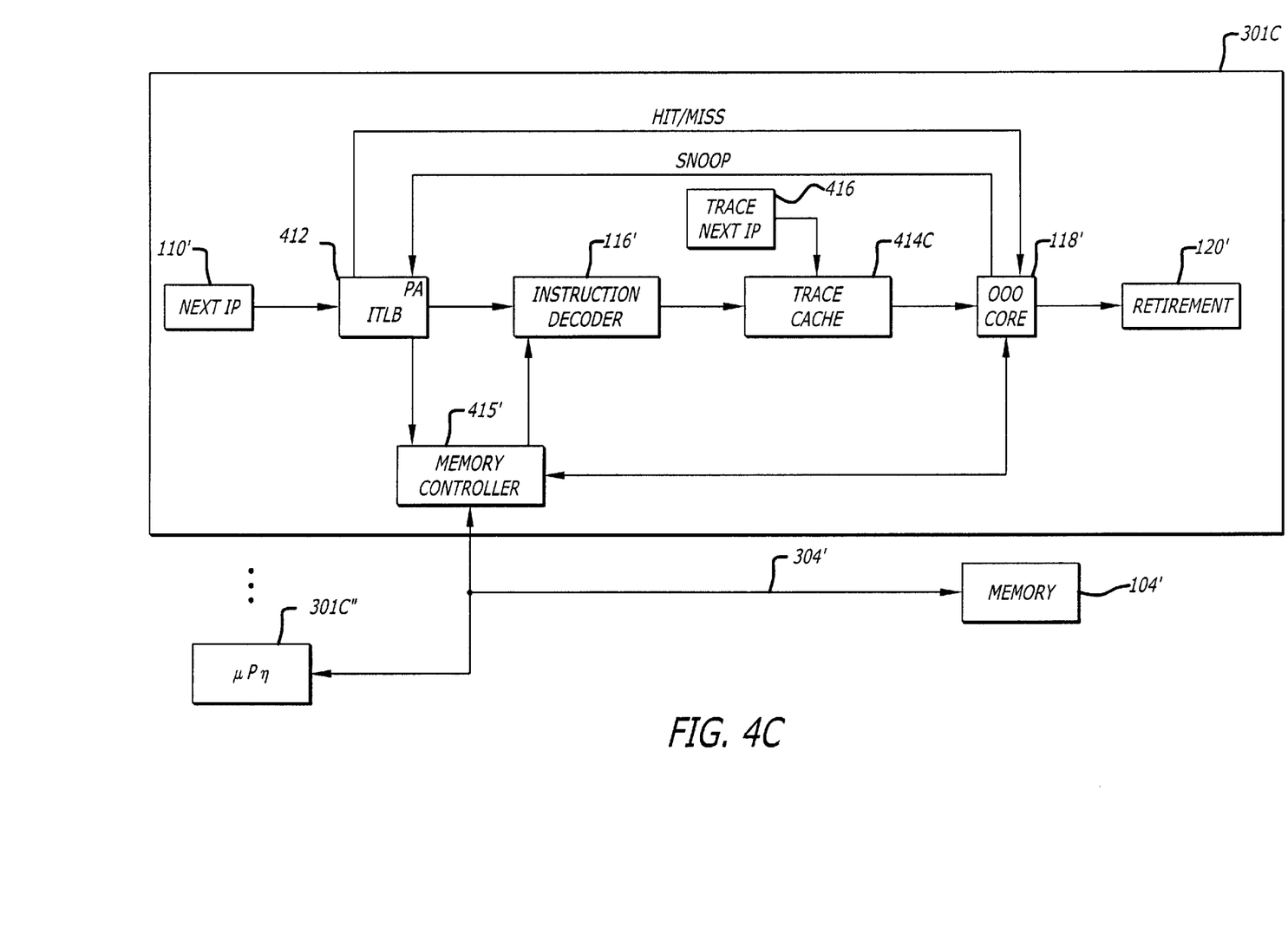
FIG. 4C illustrates a block diagram of microprocessors in a multiprocessor system coupled to a memory, the microprocessors including a third embodiment of the present invention.

Referring now to FIG. 4C, a block diagram of n microprocessors 301C through 301C" in a multiprocessor system, including a third and preferred embodiment of the present invention, are illustrated coupled to memory 104'. Microprocessor 301C, as well as the other microprocessors of the multiprocessor system, includes the next IP 110', the ITLB 412, the instruction decoder 116', a trace instruction cache 414C, a trace next instruction processor (IP) 416, the memory controller 415', the out of order core execution unit 118' and the retirement unit 120'. The instruction storage elements within the instruction decoder 116', the trace cache 414C, out of order core execution unit 118', the retirement unit 120', and other instruction storage elements are considered to be the instruction pipeline of the microprocessor. Because the advanced microprocessor 301C employs a trace instruction cache 414C which differs from other instruction caches, prior art SMC detection methods can not be used. The trace instruction cache 414C can store multiple sequences or traces of instructions for different programs in order to provide higher bandwidth and lower latency. In a trace instruction cache, only the first instruction of a series of instructions for a program (a "trace") has an address associated with it. A sequence of related instructions stored within the trace instruction cache are oftentimes referred to as a "trace" of instructions. The other instructions that follow the first instruction are simply stored within the trace cache without an associated external address. An advantage to using a trace instruction cache 414C, is that latency is further reduced over that of a linear addressed cache 414B and bandwidth is increased.

Instructions are stored in UOP form in the trace instruction cache 414C after being decoded by the instruction decoder 116'. Memory controller 415' interfaces to the ITLB 412 and the instruction decoder 116' in order to store instructions in their UOP form into the trace instruction cache 414C. In the case of a miss, memory controller 415' fetches the desired instruction from memory 104' and provides it to the instruction decoder 116'. Memory controller 415' otherwise functions as memory controller 415 previously described and monitors the memory bus 304' to detect when a store has occurred into the memory 104' in order to trigger a snoop using the physical address of the store. If the out of order core execution unit 118' itself performs a store into memory 104', it directly informs the ITLB 412 to perform a snoop and passes the physical address of the store.

In a trace instruction cache, only the first instruction has a linear address associated with it. For this reason, a trace instruction cache is referred to as being linearly addressed as opposed to physically addressed. Because only the first instruction is linearly addressable and subsequent instructions are not externally addressable, a trace cache is also referred to as being sparsely addressable. The trace instruction cache 414C is linearly addressed only to the first instruction of a trace. Subsequent instructions within a trace are addressed by the control flow of the trace instruction cache 414C and are not externally addressable. Because the trace instruction cache is linearly and sparsely addressed, snoops that perform physical address comparisons when triggered by stores into memory are not usable because of the lack of physical addresses in the trace instruction cache. Additionally because the trace instruction cache is only linearly addressed by the first instruction in a trace of instructions, subsequent instructions are not externally addressable to perform comparisons. Thus, a trace instruction cache is not suited for performing SMC detection.

Because no physical addresses are employed within the trace instruction cache 414C, it is necessary to snoop using the physical addresses within the ITLB 412 to detect self-modifying code. Memory controller 415' detects external stores into memory. Upon detecting an external store into memory, the memory controller 415' communicates to the out of order core execution unit 118' that a store into memory has occurred in conjunction with the physical address in order to trigger the snoop. Upon the out of order core execution unit 118' receiving the signal from the memory controller 415' that a store into memory 104' is being executed, a snoop is triggered where the physical address of the memory location where the store occurred is provided to the ITLB 412 to perform comparisons with physical addresses contained therein. If the out of order core execution unit 118' itself performs a store into memory 104', it directly informs the ITLB 412 to perform a snoop and passes the physical address of the store. If it is determined that the physical address of the store into memory is located on a page which has a page translation stored within the ITLB 412, it is possible that an SMC has occurred for a decoded instruction which was stored within the trace instruction cache 414C and/or instruction pipeline. In this case, an SMC hit signal is provided to the out of order core execution unit 118' indicating a possible cache incoherency condition. This causes the trace instruction cache 414C and the instruction pipeline within the out of order core execution unit 118' to be flushed by invalidating instructions (instructions ignored or disregarded and overwritten).

Figure 5A:
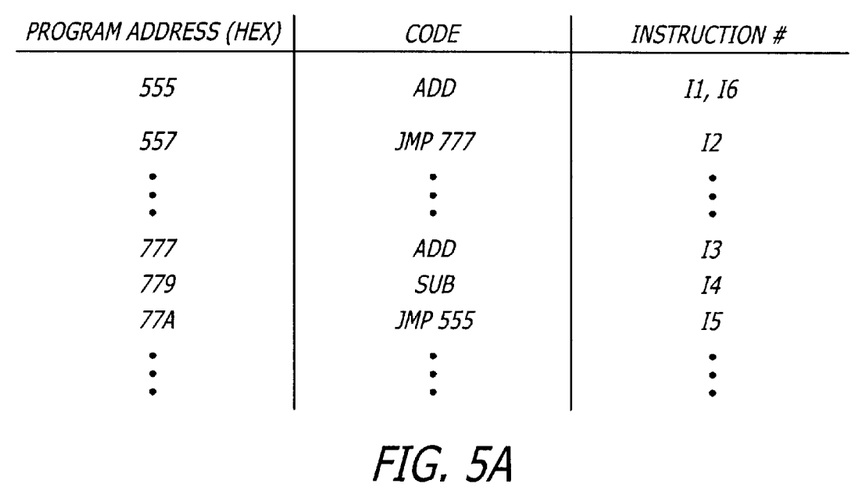
FIG. 5A is a table of instructions illustrating an exemplary program for storage in a trace instruction cache.
Figure 5B:
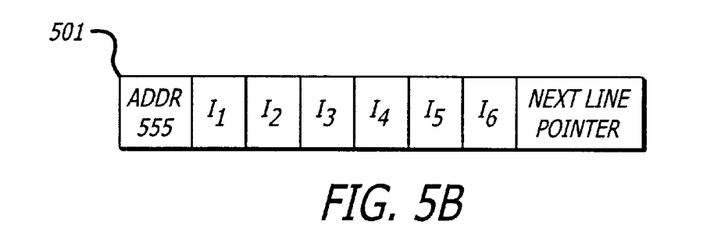
FIG. 5B is a block diagram illustrating a first cache line or head line of a trace of instructions stored within a trace instruction cache.
Figure 5C:
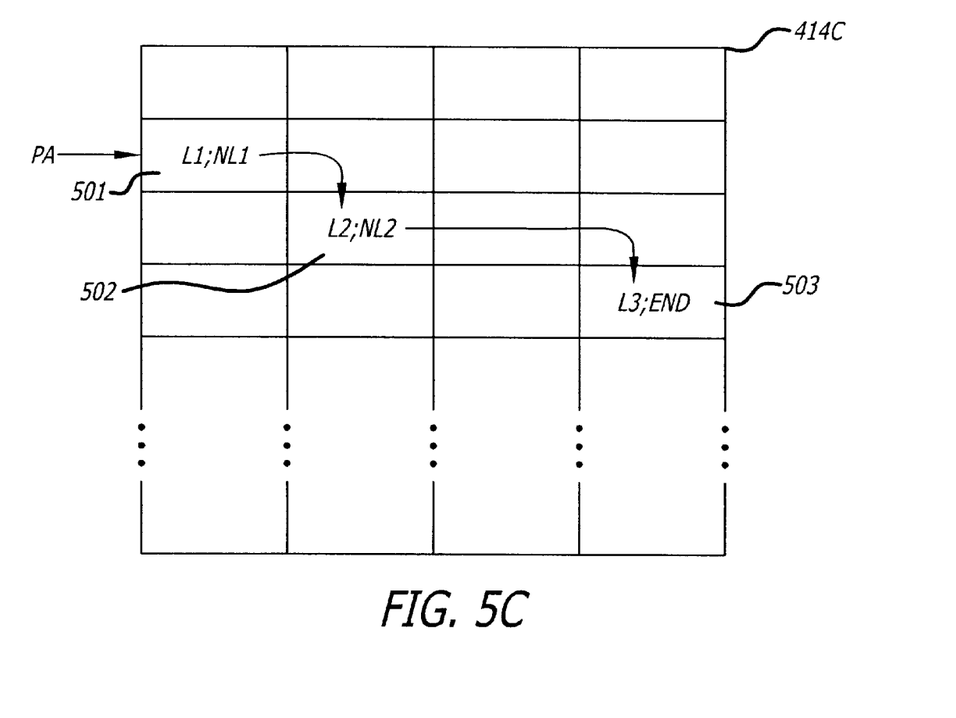
FIG. 5C is a block diagram illustrating a trace instruction cache storing an exemplary trace of instructions.
Figure 5D:
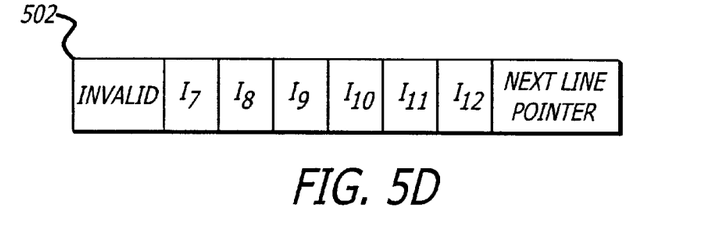
FIG. 5D is a block diagram illustrating a second cache line of a trace of instructions stored within a trace instruction cache.

The functionality of the trace cache 414C is now described. Referring now to FIG. 5A, an exemplary program is illustrated to describe the functionality of the trace instruction cache 414C. Referring now to FIG. 5B, a cache line 501 is illustrated. Cache line 501 is referred to as the headline because it's the first cache line L1 of a trace. The first cache line or the headline 501 is the only cache line addressable within a trace of instructions. In FIG. 5B the cache line is illustrated broken up into eight portions. The first portion of the headline 501 is the linear address of the first instruction in a trace within the trace instruction cache 414C. The middle portions of each cache line in the preferred embodiment are six UOPs. UOPs in the preferred embodiment are X86 instructions decoded for execution by the out of order core execution unit 118'. The last portion of the each cache line within the trace cache is a next line pointer indicating where in the trace cache to find the next cache line or indicating the end of a trace. Referring to the example of FIG. 5A and FIG. 5B, in the first portion of the headline 501 is the address 555 hexadecimal indicating the address of the first instruction of the example program. The ADD instruction, the first instruction of the program (I1), is stored in the second portion of the headline 501 illustrated in FIG. 5B. The next instruction in sequence after the first instruction, the second instruction of the program (I2), is at address 557 hex and is a JMP 777 hex instruction which is stored in the third portion of the headline 501. The next instruction sequence after the second instruction, the third instruction of the program (I3), is an ADD instruction having the program address 777 hex and is stored in the fourth portion of the headline 501. The next instruction in sequence after the third instruction, the fourth instruction of the program (I4), is a SUB instruction having a program address of 779 hex and is stored in the fifth portion of the headline 501. The next instruction in sequence after the fourth instruction, the fifth instruction of the program (150), is a JMP 555 hex instruction having a program address of 77A which is stored in the sixth portion of the headline 501. The next instruction in sequence after the fifth instruction, the sixth instruction of the program (I6), is a repeat of the ADD instruction having the program address 555 which is stored in the seventh portion of the headline 501. The next portion of the headline 501, the eighth portion, is a next line pointer. In the headline 501, the next line pointer, referred to as the NL1, points to the second cache line L2 within the trace instruction cache 414C if the trace continues into a second cache line. Cache lines after the headline in the trace cache are not externally addressable. If the trace does not continue beyond the headline or other cache line, the next line pointer within the given final cache line of the trace indicates an end condition of the trace. Referring now to FIG. 5C a block diagram of the trace instruction cache 414C is illustrated storing an exemplary program. The headline 501' is illustrated as being linearly addressable by a starting linear address. The address of NL1 points to the location of the second cache line L2 502 within the trace instruction cache 414C. The address of the next line pointer NL2 of the cache line L2 502 points to the location of the third cache line L3 503 within the trace instruction cache 414C. The third cache line L3 503 being the last cache line of the example trace has its next line pointer NL3 set to indicate the end of the trace. Referring now to FIG. 5D, a block diagram of the second cache line L2 502 is illustrated. Because the second cache line L2 502 is not linearly addressable, the first portion of its cache line, the address portion, is set to an invalid condition because it cannot be accessed externally. The second through seventh portions of the cache line L2 502 hold the instructions I7 through I12. The eighth portion of the cache line L2 502 is a next line pointer NL2 to point to the third cache line in the trace. In this manner, the trace instruction cache 414C stores programs of decoded instructions for execution by the out of order core execution unit 118'. Because no physical addresses are stored within the trace instruction cache 414C, the ITLB 412 containing physical addresses is utilized in order to perform snoops to detect SMC conditions and determine if the cache is coherent.

Associated with each cache line within the trace instruction cache is a valid bit to indicate validity or staleness of the instructions within the cache line. In the case that cache is incoherent, the valid bit is set or cleared as the case may be to indicate an invalid cache line so that the instructions are disregarded or ignored within the cache and the pipeline.

Figure 6:
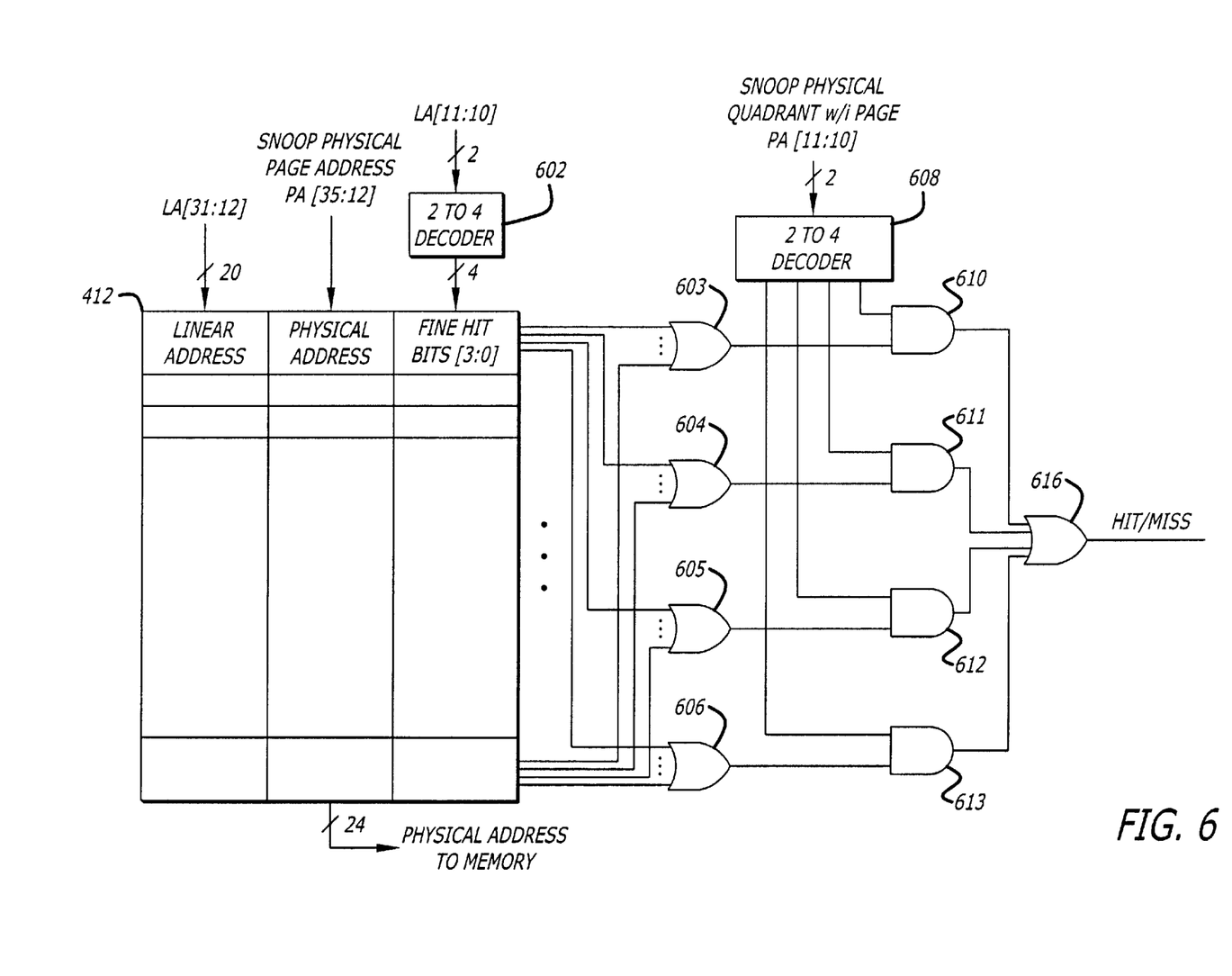
FIG. 6 is a block diagram illustrating the instruction translation lookaside buffer (ITLB) and snoop logic of the present invention.

Referring now to FIG. 6, a block diagram of the ITLB 412 with snoop logic is illustrated. The ITLB 412 includes a content addressable memory (CAM). A content addressable memory may also be referred to as an associative memory or a distributed logic memory. In the preferred embodiment the CAM is a dual port content addressable memory. A dual port content addressable memory is preferable because it can perform two comparisons concurrently. One comparison can be made using a linear address on the linear addresses therein in order to translate it into a physical address in order to fetch instructions from an instruction cache. Another comparison (also referred to as a snoop) can be made using a physical address in order to provide SMC detection. In performing snoops with the ITLB 412 (referred to as "snooping"), the content addressable memory performs comparisons using the physical address of a store into the memory 104' to determine if it is associated with instructions stored within an instruction cache. If a match is found, a store occurred into memory 104' within a page of instructions that may be stored within an instruction cache. In this case, the instruction cache and the instruction pipeline may be incoherent with memory. Because the granularity of the ITLB 412 is only to a page address, it is not absolute that an instruction within memory associated with an instruction stored within the instruction cache was altered, only that it was probably altered and the instruction cache is probably incoherent. Depending upon the size of a page utilized by the microprocessor, the content addressable memory indicating a match may be sufficient to indicate an SMC condition and that the instruction cache and instruction pipeline need to be flushed (disregarded and rewritten with newly fetched instructions from memory).

The content addressable memory of the ITLB so far described will only provide page granular snoops for stores such that any store into memory which is related to a page in the ITLB will cause an SMC hit. However, a page size may be defined as addressing a large amount of locations in memory 104'. Additionally, it is common for both instructions ("code") and data to be located within the same page of memory. Providing only page granular snooping, can cause excessive SMC hits which are false when accessing data from the same page of instructions stored into cache memory. If the page is so large, false hits may also occur for instructions not stored in the instruction cache. In order to reduce the number of false hits, the present invention provides that a page of memory can be split into smaller blocks. Each of the smaller blocks of memory within a page are associated with data bits referred to as FINE HIT bits. The FINE HIT bits can be stored with each line within the ITLB indicating a finer granularity than a page. In the preferred embodiment, the page size is 4K or 4096 addresses into memory 104'. The FINE HIT bits for simplicity are selected in the preferred embodiment to provide a granularity of 1K or 1024 addresses within a 4K page of memory. While this is the size utilized in the preferred embodiment, other granularities may be utilized. In the preferred embodiment, the ITLB 412 includes four FINE HIT bits with each line of translation contained therein, each being associated with a 1K block of addresses within a 4K page. The FINE HIT bits are originally set by instruction fetches from memory. When an instruction fetch occurs which misses the instruction cache (i.e. the desired instruction is not located within the instruction cache), an access to memory 104' occurs and uses the ITLB 412 to perform a linear to physical address translation. When performing this translation for each instruction fetch, the ITLB sets one of the fine hit bit which is associated with the block (or "quadrant") or blocks within the page that instructions are fetched from. This indicates within which block of a page of memory are instructions accessed and stored into an instruction cache. Thus, when a snoop is triggered and the ITLB matches or hits a physical address stored therein, the ITLB and the associated snoop logic illustrated in FIG. 6 first check to see if the fine hit bit associated with the 1K block is set before indicating to the out of order execution unit 118' that an SMC hit has occurred. The ITLB 412 and associated snoop logic illustrated in FIG. 6 only indicate an SMC hit if a physical match has occurred and the corresponding fine hit bit is set matching the accessed block of the page. The snoop logic illustrated in FIG. 6 includes a 2-to-4 decoder 602, OR gates 603–606 to perform a bitwise OR vector function, AND gates 610–613 to provide an AND vector operation, and an OR gate 616 to generate a SMC HIT or MISS signal indicating the possibility of an SMC condition. While this snoop logic provides for a granularity of 1k within a 4k page, other page sizes and other granularities may be selected as well known to those skilled in the art.

Under an address translation operation, a linear address is provided to the ITLB, translated into a physical address if it is present within the ITLB, and then provided to memory to read into a page of memory locations. In order to perform the translation operation, the ITLB ordinarily a single port content addressable memory with a single comparison port input, accepts the linear address and outputs a physical address if there is a match with the linear address. In order to provide a snoop operation, the ITLB is modified to include the capability of making comparisons with the physical addresses stored therein. In this case, the ITLB 412 includes a physical address input port to compare physical addresses contained therein which indicates a page hit for physical page addresses stored therein. Additionally, ITLB 412 includes fine hit bits 0 through 3 indicating which 1K block within a page may be hit. Upon an instruction fetch which stores the linear page address, LA[31:12] in FIG. 6, and the physical page address, PA[35;12] in FIG. 6, for a translation operation. During the translation operation, the linear address bits 11 and 10 within a page, LA[11:10], set the FINE HIT bits 0 through 3, FHB[3:0], for each stored physical address. In order to do this, a two to four decoder 602 converts the two linear address bits 10 and 11, LA[11:10], into the four FINE HIT bits 0 through 3, FHB [3:0], which are stored with each associated physical address in the ITLB 412. Upon performing a snoop, the physical address (PA) of the store into memory is provided by the out of order core execution unit 118'. The ITLB 412 uses the page address bits of the physical address, PA[35:12] in FIG. 6, to determine if a physical page address match occurs therein. If a physical page address match occurs, the FINE HIT bits associated with the matched physical address are output from the ITLB 412 to OR gates 603–606 of the snoop logic. One or more entries within the ITLB 412 may be matched and generate one or more sets of FINE HIT bit outputs. If during a snoop the physical page address provided to the ITLB 412 does not provide a match with a physical page address stored therein, then none of the fine hit bits are provided out to the OR gates 603 through 606, such that, all inputs to the OR gates 603–606 are all zero, the outputs of all AND gates 610–613 are zero, and the output of the OR gate 616 (the "HIT/MISS" signal) is zero. The zero output indicates that an SMC did not occur for instructions stored within the instruction cache such that coherency still exists between the instruction cache and the memory. In the case that the physical page address during the snoop matches a physical address contained within the ITLB 412, the FINE HIT bits, FHB[3:0], associated with the matching physical addresses are output to the OR gates 603–606. If no FINE HIT bit of the matched physical addresses are set to one, then all outputs from the OR gates 603–606 are zero and the outputs from the AND gates 610–613 are all zero such that a logical zero is output from OR gate 616 on the HIT/MISS signal line indicating an SMC MISS or no occurrence of an SMC condition. Assuming that one or more of the FINE HIT bits matching a physical address are set to a logical one and output to one or more of the OR gates 603–606, the output from one or more of the OR gates 603–606 is set to a logical one which is provided as an input to one or more of the AND gates 610–613. To determine further granularity of the physical snoop, the physical address bits 10 and 11, PA[11:10] are input to the 2 to 4 decoder 608. The 2 to 4 decoder 608 generates at its output the 1k block addressed within a 4k page. Each respective output from the 2–4 decoder 608 representing a 1k block is provided to each respective input of AND gates 610–613 to determine if an address match has occurred within certain blocks of a page. For example, AND gate 610 can represent a lower 1k block within a page while AND gate 613 can represent an upper 1k block within a page. If both inputs into one of the AND gates 610–613 are set to a logical one, indicating that a fine hit bit set to a logical one matches with a block address within the given page as generated by the 2 to 4 decoder 608, one of the outputs of the AND gates 610 through 613 goes to a logical one causing the output of the OR gate 616 to generate a logical high or one on the HIT/MISS signal line indicating an SMC HIT or the occurrence of an SMC condition. The SMC HIT signal is provided to the out of order core execution unit 118', indicating that the instruction cache may have an SMC condition (an incoherent cache) and require flushing the instruction cache and the instruction pipeline.

In order to provide instruction inclusion for the trace instruction cache 414C and the instruction pipeline of the microprocessor 301, INUSE bits (not shown) are provided for each line of physical address stored within the ITLB 412. Instruction inclusion guarantees that every instruction in the trace instruction cache 414C and the instruction pipeline has its original translation in the ITLB 412. By providing this inclusion, the ITLB 412 will contain the physical address (to a page granularity) of every instruction in the trace instruction cache 414C and instruction pipeline.

The present invention has many advantages over the prior art. One advantage of the present invention where snoops are performed using the ITLB is that a snoop port need not be included into an instruction cache to perform SMC detection and thus the instruction cache can be made simpler with a smaller footprint. Another advantage of the present invention is that the instruction cache need not be physically addressed such that latency of the instruction pipeline can be reduced. Still another advantage of the present invention is that latency can be further reduced and bandwidth by using a trace instruction cache.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the present invention has been described herein with reference to instructions in an instruction translation lookaside buffer (ITLB) and an instruction cache, but it is equally applicable for cache coherency between memory and a cache storing data where a translation lookaside buffer is used. Additionally, the ITLB has been described as including a dual port CAM to perform linear and physical address comparisons but a single port CAM can be used that can be multiplexed to perform comparisons on either the linear or physical addresses stored therein. Furthermore, the present invention has been described with reference to one cache, it may be applied to multiple caches providing multiple cache levels; and it also may be applied to complex microprocessors and CPUs having deep instruction pipelines. Additionally, the present invention has been described in detail as being applied to maintain cache and pipeline coherency by providing SMC detection and recovery, it can also be applied to maintain memory coherency in shared memory multi-processor systems. As a last example, it is possible to implement the present invention or some of its features in hardware, firmware, software or a combination where the software is provided in a processor readable storage medium such as magnetic, optical, or semiconductor storage.

What is claimed is:

1. A microprocessor including:
   an execution unit to trigger a snoop if a store into a memory occurs;
   a translation lookaside buffer (TLB) having a content addressable memory (CAM) and receiving a physical address indicating the location where the store occurred in the memory, the TLB to store page translations between a linear page address and a physical page address pointing to a page of memory having contents stored within a cache, the TLB including a CAM input port responsive to the snoop to compare the physical address received by the TLB with the physical page address stored therein, the TLB includes data bits providing an indication as to what portion of a page in memory has its contents stored in the cache; and
   snoop logic coupled to the TLB, the snoop logic to provide further comparison of the data bits with the physical address received by the TLB after the store into the memory, the comparison provided by the snoop logic indicating if information was modified within a portion of a page of memory correlating to information potentially located within the cache.

2. The microprocessor of claim 1 wherein if it is determined that the physical address received by the TLB matches a physical page address stored within the TLB, indicating that information was modified within the memory correlating to information potentially located within the cache, then information within the cache is invalidated.

3. The microprocessor of claim 2 wherein information within the cache is invalidated by setting a bit in the cache to indicate invalid information in a cache line and disregarding the information within the cache.

4. The microprocessor of claim 1 wherein if it is determined that the physical address received by the TLB matches a physical page address stored within the TLB, indicating that information was modified within the memory correlating to information potentially located within the cache or a pipeline, and the microprocessor provides inclusion for the cache and the pipeline, then information within the cache and the pipeline are invalidated.

5. The microprocessor of claim 4 wherein information within the cache and the pipeline are invalidated by setting a bit in the cache to indicate invalid information in a cache line and disregarding the information within the cache and the pipeline.

6. The microprocessor of claim 4 wherein the TLB maintains original page translations for all bytes of information within the cache and the pipeline to provide inclusion.

7. The microprocessor of claim 1 wherein the data bits providing an indication as to what portion of a page in memory has its contents stored in the cache are FINE HIT bits.

8. The microprocessor of claim 1 wherein if it is determined that the physical address received by the TLB matches a physical page address stored within the TLB and the snoop logic indicates that the physical address matches the portion of the page of memory associated with the data bits, indicating that information was modified within a portion of the page of memory correlating to information located within the cache, then information within the cache and a pipeline are invalidated.

9. The microprocessor of claim 8 wherein information within the cache and the pipeline are invalidated by setting a bit in the cache to indicate invalid information and disregarding the information within the cache and the pipeline.

10. The microprocessor of claim 8 wherein the data bits providing an indication as to what portion of a page in memory has its contents stored in the cache are FINE HIT bits.

11. The microprocessor of claim 1 wherein the cache is a trace instruction cache and the information stored therein is instructions and the TLB is an instruction translation lookaside buffer (ITLB).

12. A method of self modifying code detection for cache coherency, the method comprising:
storing page table translations in a translation lookaside buffer, the stored page table translations including linear page addresses associated with physical page addresses into a physically addressable memory for information stored into a cache memory;
setting data bits associated with each stored page table translation indicating what portion of a page in the physically addressable memory has its information stored into the cache memory;
providing a physical memory address of a store into the physically addressable memory; and comparing the provided physical memory address to the physical page memory addresses included in the stored page table translations to determine if the physically addressable memory has been updated by self modifying code.

13. The method of claim 12 wherein the comparing generates a match between the provided physical memory address and one or more of the physical page memory addresses included in the stored page table translations indicating the potential occurrence of self modifying code and cache incoherency.

14. The method of claim 13 further comprising:
invalidating the instructions within the cache memory and an instruction pipeline for execution and fetching new instructions from the physically addressable memory to overwrite the invalidated instructions after the comparing generates a match indicating the potential occurrence of self modifying code and cache incoherency.

15. The method of claim 12 further comprising:
comparing the provided physical memory address to the data bits associated with the stored page table translations to determine if the physically addressable memory has been updated by self modifying code within portions of pages in the physically addressable memory.

16. The method of claim 12 further comprising:
maintaining original stored page table translations for all bytes of information within the cache memory and an instruction pipeline.

17. A computer including:
a memory; and
at least one microprocessor, the at least one microprocessor including,
an instruction cache to store instructions for execution,
an execution unit coupled to the instruction cache to execute the instructions stored therein, the execution unit to trigger a snoop if a store into the memory is executed,
an instruction translation lookaside buffer (ITLB) having a content addressable memory (CAM) and receiving a physical address indicating the location where the execution of the store occurred in the memory, the ITLB to store page translations between a linear page address and a physical page address pointing to a page of the memory having contents stored within the instruction cache, the ITLB including a CAM input port responsive to the snoop to compare the physical address received by the ITLB with the physical page address stored therein, the ITLB includes data bits providing an indication as to what portion of a page in memory has its contents stored in the instruction cache;
snoop logic coupled to the ITLB, the snoop logic to provide further comparison of the data bits with the physical address received by the ITLB after a store into the memory, the comparison provided by the snoop logic indicating if an instruction was modified within a portion of a page of memory correlating to an instruction located within the instruction cache; and
wherein if it is determined that the physical address received by the TLB matches a physical page address stored within the ITLB, indicating that an instruction was modified within the memory correlating to an instruction located within the instruction cache, then instructions within the instruction cache and an instruction pipeline within the execution unit are invalidated.

18. The computer of claim 17 wherein the instruction cache is a trace instruction cache.

19. A microprocessor including:
   a memory controller to trigger a snoop if a store into a memory occurs;
   a translation lookaside buffer (TLB) having a content addressable memory (CAM) and receiving a physical address indicating the location where the store occurred in the memory, the TLB to store page translations between a linear page address and a physical page address pointing to a page of memory having contents stored within a cache, the TLB including a CAM input port responsive to the snoop to compare the physical address received by the TLB with the physical page address stored therein, the TLB includes data bits providing an indication as to what portion of a page in memory has its contents stored in the cache; and
   snoop logic coupled to the TLB, the snoop logic to provide further comparison of the data bits with the physical address received by the TLB after the store into the memory, the comparison provided by the snoop logic indicating if information was modified within a portion of a page of memory correlating to information potentially located within the cache.

20. The microprocessor of claim 19 wherein if it is determined that the physical address received by the TLB matches a physical page address stored within the TLB, indicating that information was modified within the memory correlating to information potentially located within the cache or a pipeline, and the microprocessor provides inclusion for the cache and the pipeline, then information within the cache and the pipeline are invalidated.

21. The microprocessor of claim 19 wherein the cache is a trace instruction cache and the information stored therein is instructions and the TLB is an instruction translation lookaside buffer (ITLB).

* * * * *

UNITED STATES PATENT AND TRADEMARK OFFICE
CERTIFICATE OF CORRECTION

PATENT NO. : 6,594,734 B1
DATED : July 15, 2003
INVENTOR(S) : Kyker et al.

It is certified that error appears in the above-identified patent and that said Letters Patent is hereby corrected as shown below:

Column 10,
Line 47, delete "150", insert -- I50 --.

Signed and Sealed this

Thirtieth Day of September, 2003

JAMES E. ROGAN
*Director of the United States Patent and Trademark Office*